(12) United States Patent
Renner et al.

(10) Patent No.: US 9,096,271 B2
(45) Date of Patent: Aug. 4, 2015

(54) AXLE SUPPORT OF A VEHICLE, SAID SUPPORT CONSISTING OF FIBER-REINFORCED PLASTIC MATERIAL

(71) Applicant: Bayerische Motoren Werke Aktiengesellschaft, Munich (DE)

(72) Inventors: Marco Renner, Lengenfeld (DE); Nino Lailach, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/261,524

(22) Filed: Apr. 25, 2014

(65) Prior Publication Data

US 2014/0232143 A1 Aug. 21, 2014

Related U.S. Application Data

(63) Continuation of application No. PCT/EP2012/067170, filed on Sep. 4, 2012.

(30) Foreign Application Priority Data

Oct. 28, 2011 (DE) .......................... 10 2011 085 383

(51) Int. Cl.
*B60N 99/00* (2006.01)
*B62D 27/06* (2006.01)
(Continued)

(52) U.S. Cl.
CPC .............. *B62D 27/065* (2013.01); *B62D 21/11* (2013.01); *B62D 29/04* (2013.01); *Y10T 29/49622* (2015.01)

(58) Field of Classification Search
CPC ...... B62D 27/065; B62D 21/11; B62D 29/04; Y01T 29/4922

USPC ................... 296/35.1, 193.07, 204; 180/311; 280/124.109, 785, 788
See application file for complete search history.

(56) References Cited

U.S. PATENT DOCUMENTS

2007/0057535 A1    3/2007  Wolf
2010/0133773 A1*   6/2010  Buschjohann et al.   280/124.109

FOREIGN PATENT DOCUMENTS

DE    90 02 839 U1    5/1990
DE    199 22 800 A1   11/1999
(Continued)

OTHER PUBLICATIONS

International Search Report (PCT/ISA/210) with English translation dated Apr. 11, 2013 (7 pages).
(Continued)

*Primary Examiner* — Lori L Lyjak
(74) *Attorney, Agent, or Firm* — Crowell & Moring LLP

(57) ABSTRACT

An axle support of a vehicle, in particular a passenger motor vehicle, consists of an upper shell and a lower shell, each of which is formed from a carbon fiber-reinforced plastic material. When the upper shell and the lower shell are assembled together, they form a hollow body. In this case, the upper shell and the lower shell are screwed together by way of metal insert parts, which are laminated at least in sections into the shell parts. A core part, in particular formed from a plastic foam, for transferring the shear stresses over a wide area can be glued into the cavity between the upper shell and the lower shell at least in the region of the opposing metal insert parts. Furthermore, at least one of the insert parts can be designed simultaneously for connecting an add on part.

13 Claims, 1 Drawing Sheet

(51) Int. Cl.
*B62D 21/11* (2006.01)
*B62D 29/04* (2006.01)

(56) References Cited

FOREIGN PATENT DOCUMENTS

| DE | 10 2004 049 398 A1 | 7/2005 |
|---|---|---|
| DE | 10 2005 017 031 A1 | 10/2006 |
| DE | 10 2005 055 978 A1 | 5/2007 |
| DE | 10 2006 017 225 A1 | 10/2007 |
| DE | 10 2007 030 929 A1 | 1/2009 |
| DE | 10 2009 021 964 A1 | 11/2010 |
| DE | 10 2009 031 838 A1 | 1/2011 |
| EP | 1 609 704 B1 | 8/2007 |
| EP | 2 527 231 A2 | 11/2012 |
| WO | WO 00/66417 A1 | 11/2000 |
| WO | WO 2011/141538 A1 | 11/2011 |

OTHER PUBLICATIONS

German-language Search Report with partial English translation dated Jun. 11, 2012 (10 pages).

\* cited by examiner

AXLE SUPPORT OF A VEHICLE, SAID SUPPORT CONSISTING OF FIBER-REINFORCED PLASTIC MATERIAL

CROSS REFERENCE TO RELATED APPLICATIONS

This application is a continuation of PCT International Application No. PCT/EP2012/067170, filed Sep. 4, 2012, which claims priority under 35 U.S.C. §119 from German Patent Application No. 10 2011 085 383.9, filed Oct. 28, 2011, the entire disclosures of which are herein expressly incorporated by reference.

BACKGROUND AND SUMMARY OF THE INVENTION

The invention relates to an axle support of a vehicle, in particular a passenger motor vehicle, wherein the axle support consists of an upper shell and a lower shell, each of which is formed from a fiber reinforced synthetic plastic material, in particular a carbon fiber-reinforced synthetic plastic material. When the upper shell and the lower shell are assembled together, they form a hollow body. With respect to the prior art, reference is made to both EP 1 609 704 B1 and WO00/66417.

The former publication, EP 1 609 704 B1, describes an axle support, in the form of a chassis of a truck. In this case the axle support consists of an upper shell and a lower shell, which are connected to each other with a material bond such as by fusing, adhesively cementing or welding. The second publication, WO00/66417, describes a so called wheel support for vehicles. This wheel support may also be an axle support, which is composed of support profiles made of a fiber-reinforced synthetic plastic, wherein metal connecting components are laminated or cast into the synthetic plastic of the support profiles.

There is needed an axle support of the above-described type which includes metal insert parts integrally laminated therein that has increased strength with respect to the known axle support.

The present invention meets this need by the fact that the upper shell and the lower shell are screwed together via the metal insert parts that are laminated at least in sections into these shell parts. Preferably, the upper shell and the lower shell, of which one in turn may consist of several sections (a plurality of pieces), are composed of a plurality of layers of fiber reinforced preforms (prepregs), so that the metal insert parts can be easily laminated into the respective shell between two superimposed preforms. This approach is known from the prior art. It is now proposed to screw the two shells together more or less by use of these insert parts, since the clamping forces that are associated with such a screwed connection can be introduced into the upper shell and the lower shell respectively in the best possible way via the insert parts of the shells or, more specifically, can be distributed over a large area of the upper and lower shell. A screw connection provided by the invention is, as desired, simpler than an adhesive bonding or welding of a complicated parting line extending between the two shells and is, in particular, also even more advantageous for any necessary repair, because then not the complete axle support, but only one shell or, more specifically, only the defective shell, has to be replaced.

It is particularly advantageous if such an insert part is designed for connecting an add-on part, such as a wheel guiding connecting rod, a transverse stabilizer or an axle drive. With the same screw connection, with which the upper shell is connected by way of its insert part to the lower shell or more specifically is connected to the insert part, (any) add on part can also be mounted on the axle support according to the invention. In this case a corresponding bearing block for receiving an add-on part can be already molded on the insert part. At the same time a passage hole can be provided in the insert part; and a screw or the like may be inserted through the passage hole. Then, the screw is supported by this insert part. However, it is also possible that the insert part acts in essence as a screw bolt or as a screwed nut, so that either a screwed nut can be mounted on the insert part or a screw bolt can be screwed into the insert part.

Since at this point such a suitably designed insert part is provided, as proposed, almost opposite each other in the upper shell and the lower shell, the upper shell and the lower shell can be screwed together, i.e. tightened, virtually against one another by way of a screw connection. In this case the corresponding screw can be explicitly an independent component. In this case the screw, or rather the independent component, is supported by a first insert part (or more specifically, the upper shell) and is screwed into a second insert part (for example, the lower shell). In order to further increase the strength of an axle support according to the invention, the upper shell and the lower shell (or the optionally provided individual parts of the shell) can be, in addition, glued to each other or can be connected (for example, welded) to each other by material bonding in any other way. Preferably such a connection is provided along the respective parting lines between the components. Then, the additional screw connection according to the invention increases the strength or more specifically the stiffness of an axle support according to the invention.

In order to further increase the strength and to prevent local bulging or buckling due to occurring shear stresses, a prefabricated core part, in particular formed from a plastic foam, for transferring the shear stresses over a wide area can be adhesively cemented into the cavity between the upper shell and the lower shell at least region by region and preferably in the region of the opposing metal insert parts. Then the screw connection according to the invention can go through this core part.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
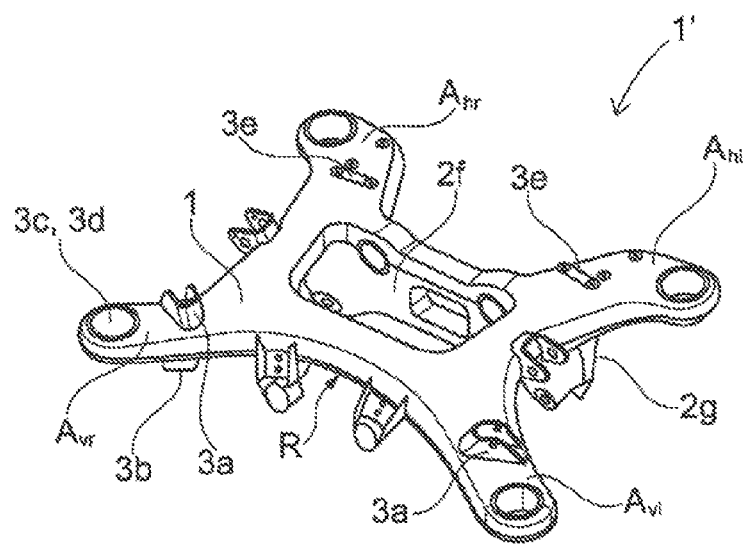
FIG. 1 is a spatial representation, as viewed from above, of an embodiment of an axle support for the rear axle of a passenger motor vehicle according to the invention.

Referring to the Figures, reference numeral 1 marks a so called upper shell of the axle support, while a plurality of individual parts of the lower shell bear the reference numerals 2a, 2b, 2c, 2d, 2e, 2f, 2g. In the assembled state, i.e. in the state in which the individual parts are connected to the upper shell 1, the individual parts form a lower shell 2. In this assembled state the upper shell 1 and the lower shell 2 form then, in essence, a hollow body in the form of a conventional axle support, which, as shown in the present case from a geometric perspective, consists in essence of a rectangular frame R and four arms $A_{vl}$, $A_{vr}$, $A_{hr}$, $A_{hl}$ (hereinafter "arms $A_{xy}$") which project outwards from the corners of the frame R approximately in the diagonal direction. In the letter designation for the arms $A_{xy}$, when viewed in the direction of travel of a vehicle provided with this rear axle support, the first index v stands for "front" and h stands for "rear", while the second index r stands for "right" and l stands for "left."

Figure 2:
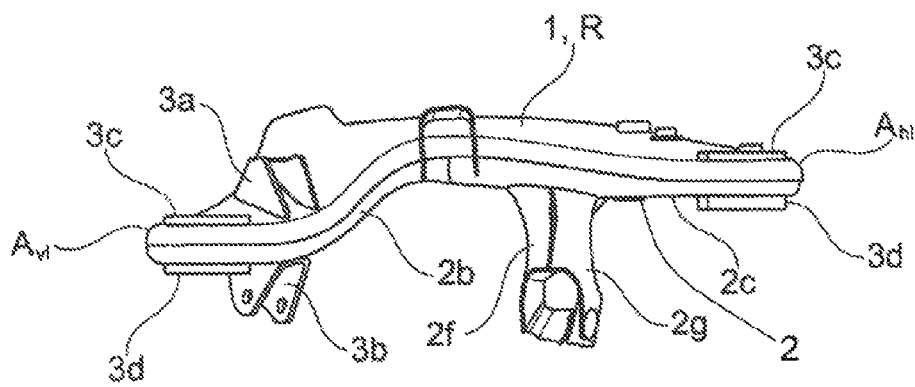
FIG. 2 is a side view of the axle support of FIG. 1.
Figure 3:
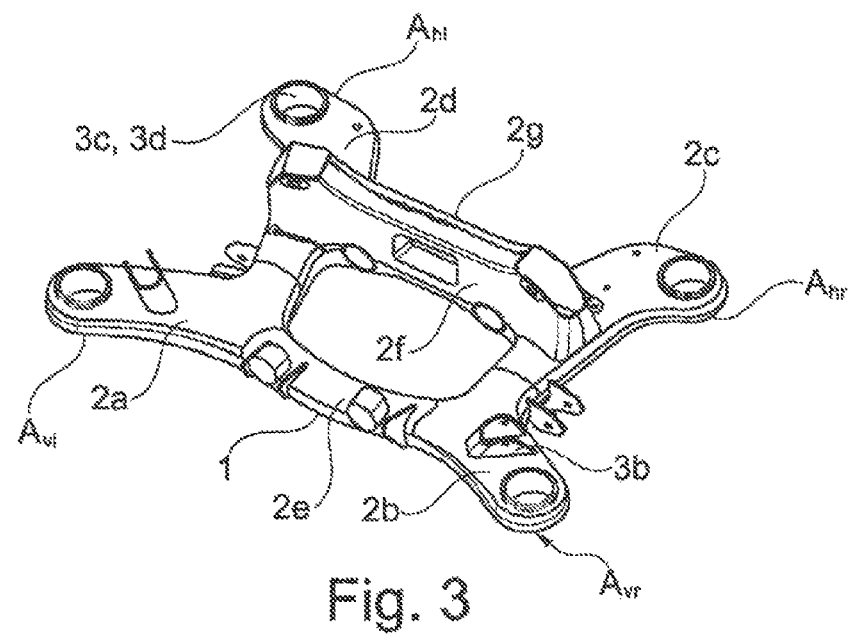
FIG. 3 is a three dimensional view of the underside of the axle support of FIG. 1.

FIG. 2 shows that the rear arms $A_{hy}$ lie in essence in the same plane as the frame R, while the front arms $A_{vy}$ virtually protrude downwards from the plane of the frame R. Furthermore, it is clear that the lower shell individual parts 2f and 2g, which interact with the rear upper shell frame edge, which extends in the transverse direction of the vehicle, or rather which complement the rear upper shell frame edge, are formed in such a way that the individual parts of the lower shell form additionally a transverse bridge, which in turn is formed by means of two shell parts that complement this transverse bridge. That is, the transverse bridge is formed by means of the individual parts 2f and 2g of the lower shell.

In addition to the aforementioned components, the axle support 1' has additional components, which are formed by way of the insert parts 3x (where x=a, b, c, . . . ) in the upper shell 1 or in one of the individual parts 2a - 2d of the lower shell. These additional components are assigned specific functions. The insert parts 3x are formed entirely from a metal material and are integrally molded into the upper shell 1 or the respective individual part 2y (y=a d) of the lower shell. The upper shell 1 and the individual parts 2y of the lower shell are formed, in particular, from a carbon fiber-reinforced synthetic plastic material. During the fabrication of the synthetic plastic material, the insert parts 3x are integrally molded in a conventional manner. That is, the insert parts are integrally laminated with a subregion of the respective insert part 3x. The forces, which are absorbed by the respective insert part 3x, can be transferred over a large area of the synthetic plastic material of the upper shell 1 or the individual part 2y of the lower shell by way of each insert part 3x, which is integrally laminated with its aforementioned flat and relatively small subregion, which is not shown in the drawings of the figures, into the two dimensional, flat plastic material of the upper shell 1 or the respective individual part 2y of the lower shell.

At this point, the insert parts 3a, 3b will be considered in detail, as a substitute for the plurality of provided insert parts 3x. In this respect the insert part 3a may be found in the arm $A_{vr}$ of the upper shell 1 and forms, as can be seen, a bearing block, on which an add-on part, in the present case a wheel guiding connecting rod (not depicted in the drawing) can be mounted. When viewed in the vertical direction, an additional insert part 3b, which forms such a bearing block, is provided more or less directly below this insert part 3a in the individual part 2b of the lower shell that also forms this arm $A_{vr}$. At this point the individual part 2b of the lower shell is bolted to the upper shell 1 by way of these two insert parts 3a, 3b, in that a connecting screw (with a nut or mating thread in one of the insert parts 3a, 3b) or a thread and clamping bolt connection tightens these two insert parts 3a, 3b against each other with, for example, externally applied nuts and, as a result, also tightens the individual part 2b of the lower shell against the upper shell 1. An identical arrangement may be found on the arm $A_{vl}$.

Furthermore, the upper shell 1 and the respective individual part 2y of the lower shell are connected together in the free end section of each of the arms $A_{xy}$ by way of the metal insert parts 3c, 3d, which are integrally laminated in sections. When these metal insert parts are assembled together, they form, as shown, in each case a receptacle for a bearing, by which the axle support is mounted or rather secured on the underbody of a vehicle. Furthermore, the upper shell 1 and the respective individual part 2y of the lower shell are connected to each other in the region of the transverse bridge, which is formed by the individual parts 2g and 2f of the lower shell. For this connection, in the upper shell 1 or, more specifically, in its arms $A_{hl}$, $A_{hr}$, there are insert parts 3e, which act more or less as nuts, into which screws (not shown) are screwed starting from the transverse bridge (formed by the individual parts 2f, 2g of the lower shell).

Moreover, additional insert parts (3) that are provided can serve as a screw connection between the upper shell 1 and a respective individual part 2y of the lower shell. Since this screw connection is provided in a way that is comparable to the above described type, there is no need to delve into the details at this point. Rather, it ought to be explained that a core part, which is formed preferably from a plastic foam, but which cannot be seen in the figures, can be used and, in particular, can be glued into the cavity, which is formed by the upper shell 1 and the lower shell 2 or more specifically by the respective individual part 2y of the lower shell, and which can be closed in sections, but does not have to be automatically closed. Preferably, such core parts, which, considered individually, by no means need to fill the cavity completely, are provided in such regions or sections, in which the upper shell 1 and the respective individual part 2y of the lower shell are connected together by a screw connection with insert parts (3). Since in these regions or sections the respective core part is virtually clamped between the upper shell 1 and the respective individual part 2y of the lower shell, this arrangement significantly increases the stability and the strength of the axle support. Finally, it must be pointed out that a number of details can be designed so as to deviate from the above explanations, without departing from the subject matter of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An axle support of a vehicle, comprising:
   an upper shell formed of a fiber-reinforced plastic material;
   a lower shell formed of a fiber-reinforced plastic material;
   metal insert parts laminated, at least in sections, into the upper and lower shells, wherein
      the upper shell and the lower shell form a hollow body when assembled together, and
      screwed connections of the upper shell and the lower shell when assembled together include the metal insert parts.

2. The axle support according to claim 1, wherein the upper shell and the lower shell are formed of a carbon fiber-reinforced plastic material.

3. The axle support according to claim 1, further comprising:
   a core part of the axle support formed of a plastic foam material, wherein
      the core part is arranged in the hollow body between the upper shell and the lower shell at least in a region of opposing metal insert parts laminated in the upper shell and the lower shell, a glued connection being provided between the core part and the upper shell and the lower shell.

4. The axle support according to claim 1, wherein at least one of the metal insert parts is structurally configured for connecting an add-on part.

5. The axle support according to claim 3, wherein at least one of the metal insert parts is structurally configured for connecting an add-on part.

6. The axle support according to claim 1, wherein one of the upper shell and the lower shell comprises a plurality of individual parts that form the one shell.

7. The axle support according to claim 1, further comprising a material bond additionally connecting the upper shell and the lower shell with one another.

8. The axle support according to claim 1, wherein the axle support comprises a passenger motor vehicle axle support.

9. A method of assembling an axle support of a vehicle, the method comprising the acts of:
    forming an upper shell of the axle support of a fiber-reinforced plastic material;
    forming a lower shell of the axle support of a fiber-reinforced plastic material;
    during the formation of the upper shell and the lower shell, laminating a plurality of metal insert parts into the upper shell and the lower shell, corresponding ones of the metal insert parts of the upper shell and the lower shell being configured to allow for a screwed connection; and
    screwing together the upper shell and the lower shell via the corresponding metal insert parts.

10. The method according to claim 9, further comprising the act of:
    gluing into a hollow cavity formed between the upper shell and the lower shell a core part formed of a plastic foam material, the core part being arranged at least in a region of the corresponding metal insert parts forming the screwed connection.

11. The method according to claim 9, further comprising the act of:
    materially bonding the upper and lower shell parts to one another.

12. The method according to claim 9, wherein the act of forming one of the upper shell and the lower shell comprises the act of forming a plurality of individual parts of a fiber-reinforced plastic material, which individual parts form the respective shell.

13. The method according to claim 9, wherein the upper shell and the lower shell are formed of a carbon fiber-reinforced plastic material.

* * * * *